Fig. 1.

July 2, 1940.   A. H. VESPOLI   2,206,340
ECCENTRIC MECHANISM
Filed May 9, 1938   8 Sheets-Sheet 6

Fig. 3A.

INVENTOR
A. H. Vespoli
BY
E. F. Wendiroth
ATTORNEY

July 2, 1940.  A. H. VESPOLI  2,206,340
ECCENTRIC MECHANISM
Filed May 9, 1938  8 Sheets-Sheet 7

INVENTOR
A. H. Vespoli
BY
E. F. Wendiroth
ATTORNEY.

July 2, 1940.   A. H. VESPOLI   2,206,340
ECCENTRIC MECHANISM
Filed May 9, 1938   8 Sheets-Sheet 8

INVENTOR
A. H. Vespoli
BY
E. F. Wenderoth
ATTORNEY

Patented July 2, 1940

2,206,340

UNITED STATES PATENT OFFICE 2,206,340

ECCENTRIC MECHANISM

Aniello Henry Vespoli, London, England, assignor to Kinetor (Development) Limited, London, England, a British company Application May 9, 1938, Serial No. 206,964
In Great Britain September 23, 1936

9 Claims. (Cl. 74—571)

This invention relates to eccentric mechanisms, and has particular but not exclusive application to apparatus of the kind described in United States Patent Specification No. 2,039,842; more particularly the eccentric mechanism of the present invention may be used as a substitute for the micrometer crank mechanism referred to in the aforesaid United States patent specification.

The type of eccentric mechanism to which the present invention relates is one in which the driving shaft has a pair of parallel flats to constrain the movements of a sheave which is formed with an elongated slot so that the sheave envelops the shaft and is adjustable in a rectilinear path along the flats for a sufficient distance to set the eccentricity of the sheave to any position within the desired limits with respect to the shaft.

After the setting of the eccentricity, the shaft and sheave rotate and operate the enveloping strap. It is of course understood that in order to set the eccentricity of the sheave the shaft and sheave are brought to a certain angular position for access through the strap to setting mechanism.

The chief object of the present invention is to provide improved means for setting the eccentricity of the sheave.

According to the present invention the setting mechanism comprises essentially a screw member passing completely through the shaft and extending across the elongated slot in the sheave to bear against the end walls of the slot. Thereby the shaft and the sheave are locked together during normal operation.

Preferably the screw member is formed in two parts interconnected to rotate as one but capable of slight longitudinal movement with respect to one another.

The amount of the eccentricity due to the position of the sheave is effected by rotating the screw member which is then locked by a tightening nut mounted in the sheave.

In the case of a one-piece screw member this tightening is merely between the ends of the said screw member and the interior of the sheave.

In the case of a two-part screw member, the tightening by means of the aforesaid nut is not only effective as between the ends of the screw member and the sheave but also between the threads of the screw member and the corresponding threads in the shaft in the same direction as that in which the pressure between said threads will eventually be exerted when the working load is being transmitted through the sheave and the screw member to the shaft.

Preferably the hole in the shaft in which the screw member works is not itself screw-threaded but a screw-threaded bush is provided. In the case of a two-piece screw member each piece preferably has its own bush fitting into a counter-bored recess in the shaft thereby providing a seating for each bush at the bottom of its recess.

Preferably two screw-members arranged side by side are used, and their adjusting mechanisms are interconnected as hereinafter described.

In its application to apparatus of the kind described in the specification of United States Patent No. 2,039,842 the connection from the strap to the apparatus may pass to the pivotal connecting pin of the tractor levers of said apparatus or may be connected to the pressure ram whereby pressure may be applied through the ram to the work, the pressure applied being greater at the start of the ram stroke and varying in accordance with the power curve of the eccentric.

The invention is diagrammatically illustrated by way of example in the accompanying drawings, in which.

Figure 1:
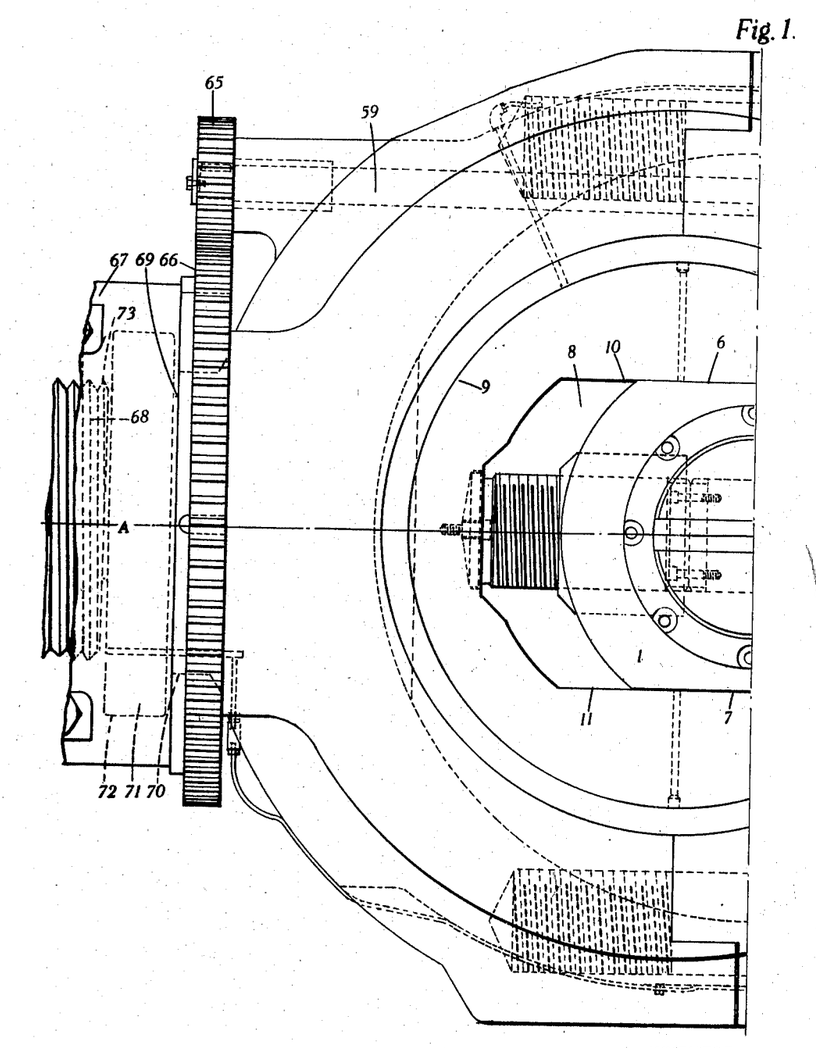
Figure 1 is a side elevation of the eccentric.
Figure 1A:
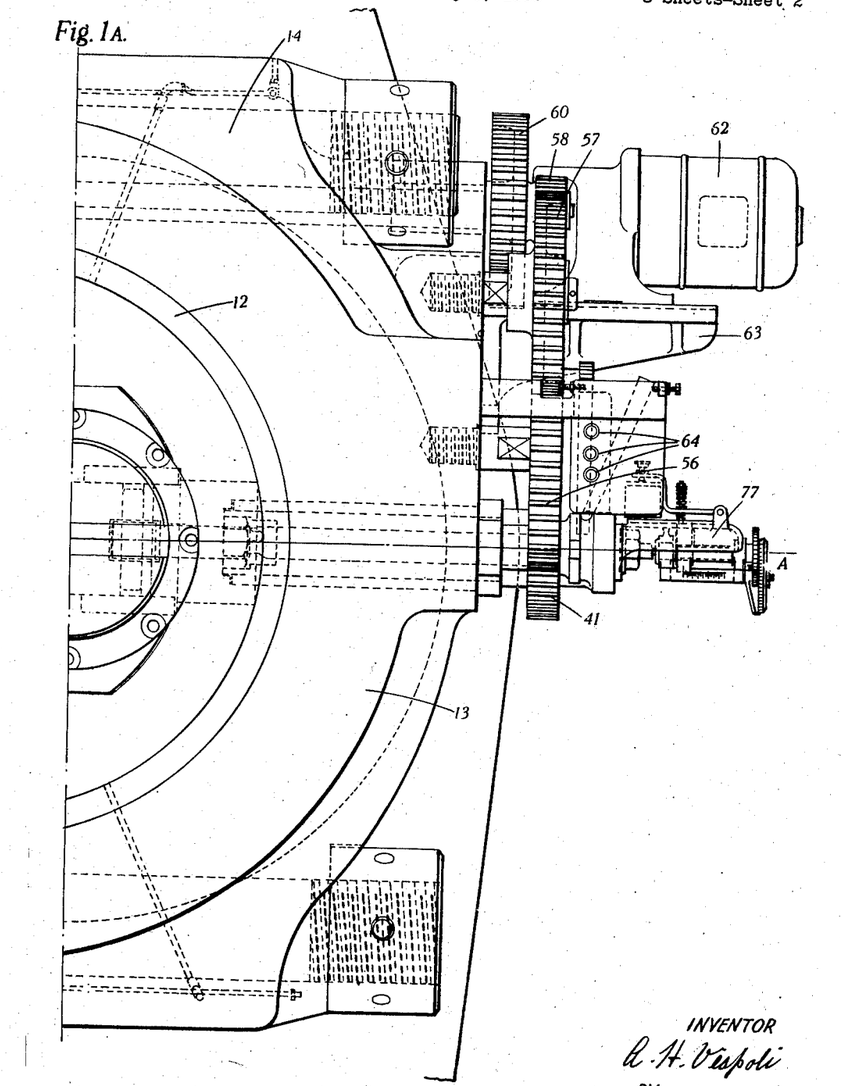
Figure 2:
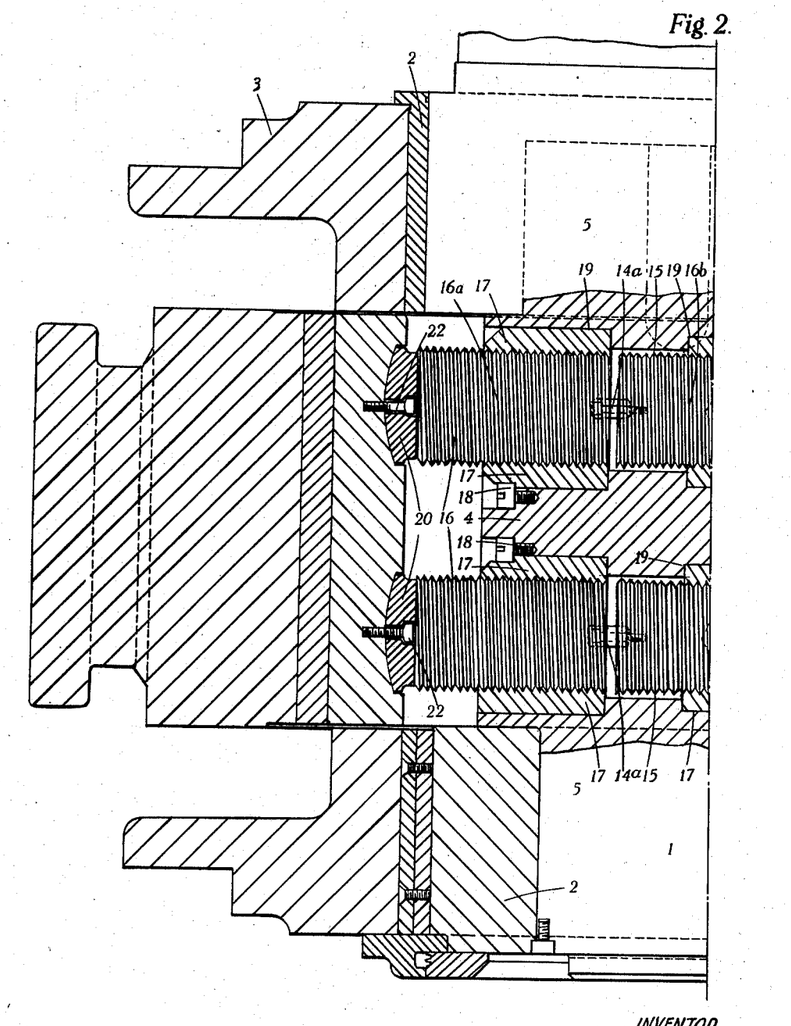
Figure 2 is a sectional plan on the line A—A on Figure 1.
Figure 3:
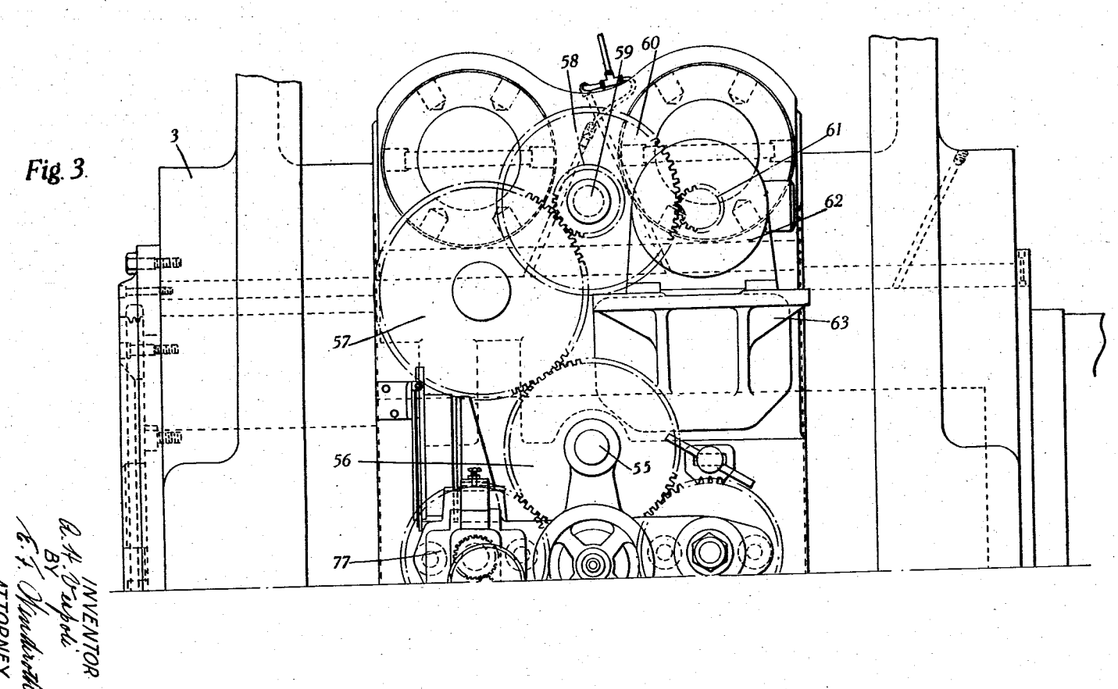
Figure 3 is a side elevation corresponding to Figure 1.
Figure 3A:
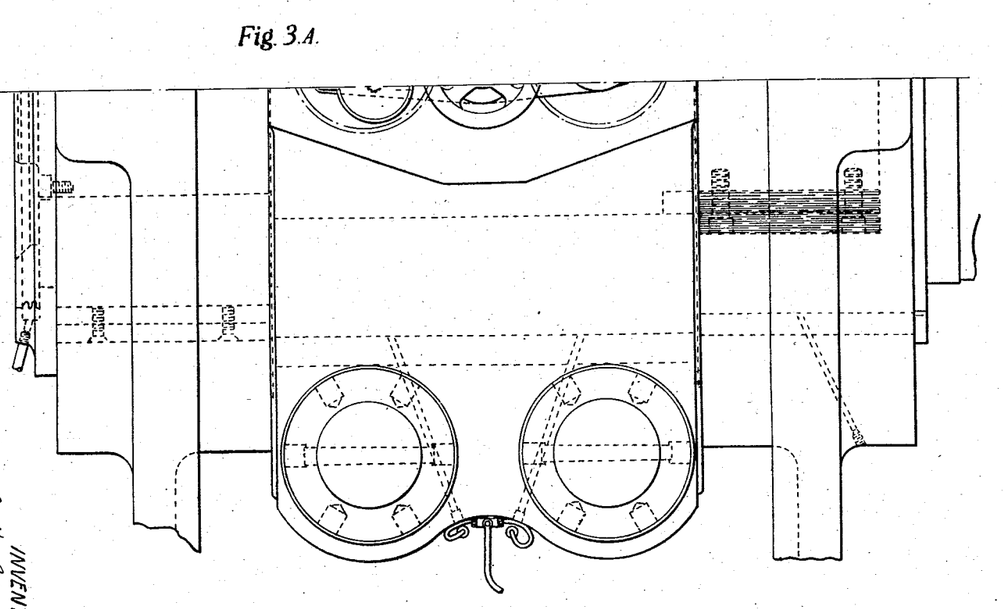
Figure 4:
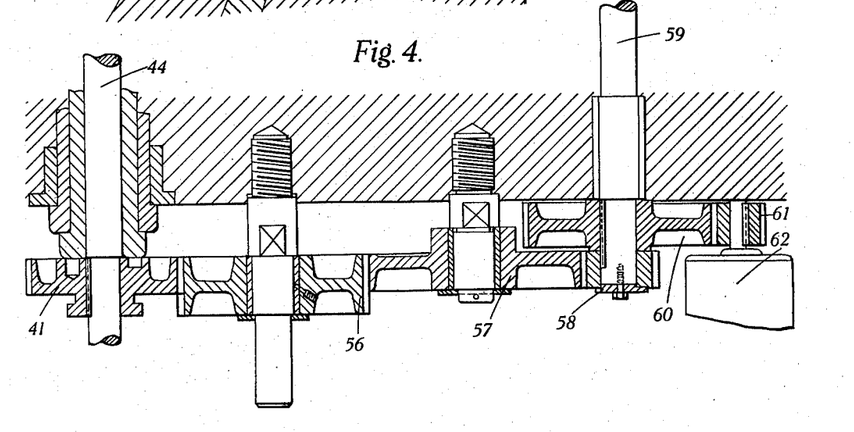
Figure 4 is an enlarged sectional plan view of the gear lay-out.

In carrying the invention into effect according to the construction illustrated in the drawings with reference more particularly to Figures 1 and 2, the drive shaft 1 of the eccentric is mounted in bearings 2, 2, in a frame 3. The middle section or block 4 of the drive shaft 1 is of circular section and of an enlarged diameter with respect to the outer bearing portions 5, 5, and is provided with flattened parallel top and bottom faces 6, 7, respectively. The shaft 1 passes through an elongated slot 8 within the eccentric sheave 9, the slot 8 being formed with flattened top and bottom faces 10, 11, and of dimensions to permit a sliding fit therein of the part 4 with the respective flattened faces 6, 7 and 10, 11 in sliding contact. The slot 8 is of a length to permit a limited axial relative movement between the drive shaft and sheave. A bushing 12 is in the usual manner provided between the eccentric sheave 9 and the eccentric strap 13, the cap portion of which is numbered 14.

Provided to pass axially through the drive shaft 1 are two adjacent parallel bores 15, 15, in which are received screw-members 16, 16, formed each in two parts 16a, 16b, which are in screw-threaded engagement with cylindrical bushings 17, 17, held by screws 18, 18, in recesses 19, 19 in the block 4.

The outer ends of the screw members 16, 16, are adapted to be self-seating on spherical bearing surfaces. In the construction shown the outer end of the portion 16b of each screw member is of spherical form to fit into a correspondingly shaped bearing surface of a thrust member 21. The outer end of the portion 16a of each screw member bears freely on the front face of a thrust member 20 having a spherically formed rear face seating in a correspondingly shaped bearing surface in the wall of the sheave, the said member 20 being restrained in its recess by a screw 22. Each thrust member 21 is pressed against its screw member by a tightening nut 23 as hereinafter described.

The screw members 16, 16, together with their co-operating parts, are identical in construction, and one only will therefore be described.

The two parts 16a and 16b of each screw member are connected together by means of a polygonal key 14a which is received within similarly formed recesses in the screw member. The two parts are thus out of contact but in rotational engagement. Thus it will be understood that on rotation of the screw members there will be a relative movement between the drive shaft 1 and the sheave 9 resulting in a variation of the throw of the eccentric.

By providing each adjusting screw in two parts and with separate bushings, the thrust during the operation of the eccentric is imparted to each part, in accordance with the direction of the thrust, without any effect on the other, so that there will be no pressure tending to force the bushings from their seatings. Furthermore the arrangement has the advantage that after the adjustment of the throw of the eccentric there will be no play between the adjusted parts when the adjustment is completed as would be the case between the drive shaft and the adjusting screws due to the play in the threads if the screw members were formed as integral units.

The parts 16a and 16b are of unequal length, the part 16a extending across the space between the block 4 and the drive shaft 1 and the inner wall of the sheave 9 on the one side, and the part 16b stopping some distance short of the inner wall of the sheave on the other, for the reception—between the spherically formed end of the part 16b and the outer periphery of the sheave 9—of the thrust member 21 and a tightening-nut 23, which latter also stops short of the outer periphery of the sheave 9. The tightening-nut 23 is externally screw-threaded for axial movement as hereinafter described. An axially extending coupling pin 24, secured by a transverse pin 25 to the part 16b, projects through aligned holes in the thrust member 21 and in the tightening-nut 23. The end of the coupling pin 24 projects into a central cavity formed in the tightening-nut 23 and is screw-threaded along part of its length for the reception of a hexagonal locking nut 26. On the projecting end of the coupling pin 24 are formed dogs 26a which project beyond the nut 26 in its locked position, but stop short of the outer peripheral surface of the sheave.

Provided in the cap portion 14 of the eccentric strap 13 at positions to lie horizontally and in alignment with the bores 15, 15, in the drive shaft when these bores are horizontally disposed, are channels 27, 27, of circular cross-section. The walls of each channel 27 are lined with two concentric cylindrical locking barrels, an inner barrel 28 and an outer barrel 29, both of which are adapted for a longitudinal movement in the channel 27. The inner ends of the barrels are formed as box spanners, the inner barrel 28 being formed with a cavity of polygonal cross section so as to be adapted to engage and rotate the locking nut 26 and the outer barrel 29 being formed of a larger polygonal cross-section on its outer face to be adapted for engagement with the similarly formed inner walls of the recess provided in the tightening-nut 23.

The barrels 28, 29, are formed at their outer ends which extend externally of the eccentric cap with outwardly extending flanges 30, 31, which limit the extent of inward movement of the barrels, the flanges being formed with polygonal heads so as to be adapted to be rotated by means of a wrench, spanner or the like.

The barrels are restrained from relative longitudinal movement by means of a screw 32, which projects through the wall of the outer barrel 29 into an annular groove 33 formed in the outer wall of the inner barrel 28.

A stop 34 is secured on the wall of the outer locking barrel 29, which stop is adapted to slide in an axial groove 35 formed in a bushing 36 provided in the eccentric cap. An annular groove 37 in the bushing 36 forms a continuation of the groove 35 to permit of a limited angular movement of the stop 34 therein at the end of its forward travel in the groove 35. At the end of the groove 37 is formed an axially extending recess or cavity 38, the stop 34 thus permitting a further small forward movement of the outer barrel 29 after the stop has reached the end of the groove 37, in which position the flange 30 will abut against the outer end face of the flange 31 of the locking barrel.

A stop 39 in the form of a spring-pressed plunger is provided to project from the end face of the inner locking barrel 28 and is received within a groove 40 formed in the end face of a gear wheel 41 forming part of the train of gears by means of which the adjustment of the eccentric throw is effected. The groove 40 is slightly longer than the groove 37 in the outer locking barrel 29. The inner locking barrel 28 is thus adapted to be rotated a limited extent as determined by the length of the groove 40. At the end of the groove 40 in the end face of the gear wheel 41 is formed a cavity 42 which permits of the gear wheel 41 being moved forward so that the inner end face lies flush with the outer end face of the inner locking barrel 28 when the plunger and cavity are in alignment.

The gear wheel 41 is mounted with sliding movement on a shaft 44 which is mounted within the inner locking barrel 28. The shaft 44 has dogs 45 formed at its other end, which are adapted to engage the dogs 26a in the adjusting operation.

A collar 43 is secured at the end of the locking shaft 44 at a position immediately to the rear of the dogs 45. The collar 43 is seated on a shoulder 46 formed by cutting back the inner wall at the end of the inner locking barrel 28 and enables the locking barrels to be withdrawn after adjustment as hereinafter described.

The gear wheel 41 and its corresponding wheel 41a are secured respectively on the ends of the locking shafts 44 and 44a. The shafts 44, 44a are supported on the laterally extending arms 47 and 47a of a movable bracket 48. The bracket 48 is adapted to impart an axial movement to the shafts 44, 44a, and the gear wheels mounted thereon, by means of a handwheel 49 mounted on a shaft 50 screw-threaded in the eccentric cap.

To enable the gear wheels and shafts to be withdrawn members 51 are provided rotationally mounted on spindles 52 to project inwardly of the arms of the bracket 48, the members 51 rotating in grooves 53 formed on bosses 54 on the gear wheels 41 and 41a.

The bracket 48 is supported by a shaft 55 projecting from the eccentric cap on which is mounted a gear wheel 56 engaging the wheels 41 and 41a, and also engaging an idler wheel 57, which engages with a pinion 58 mounted on a shaft 59, the shaft 59 being mounted in bearings in the eccentric cap and extending the length of the eccentric. The shaft 59 serves through gearing, as hereinafter described, to adjust the length of the connecting-rod or the equivalent, by means of which the eccentric is secured to the driven part or member, in accordance with the extent of adjustment of the throw of the eccentric.

A gear wheel 60 is secured at one end of the shaft 59 and meshes with the pinion 61 of an electric motor 62, which is mounted on a bracket 63 on the eccentric cap, and which serves not only to drive the shaft 59 but also to operate the gearing by means of which the eccentric throw is adjusted. The operation of the motor 62 is controlled electrically by control means such as switches or press buttons 64 on a switch box 64¹, carried by the movable bracket 48 located behind a stationary drilled cover plate 64x, so that the forward starting stopping and reversing of the motor can only be effected when the buttons or switches are exposed beneath the holes in the plate.

The teeth of the gear wheel 56 are provided of a width greater than the width of the teeth of the gear wheels 41 and 41a, so that they may remain in engagement during the axial movement of the wheels.

A gear wheel 65 is secured on the other end of the shaft 59 and engages with gear teeth 66 encircling the end of a cylindrical split jointing sleeve 67 by means of which the eccentric is connected to the driven member 68.

The eccentric is formed with an extended portion 69 for connection to the split sleeve 67. In the part 69 is provided an annular groove 70 having an outer portion 71 of larger diameter to be received within an undercut recess 72 in the walls of the sleeve 67.

At the other end the sleeve 67 is internally screw-threaded at 73 for screw-threaded engagement with the correspondingly screw-threaded end of the driven member 68 so that rotation of the gear wheel 65 causes rotation of the sleeve 67 with a resultant axial movement of the part of the driven member 68 screw-threaded therein.

Figure 5:
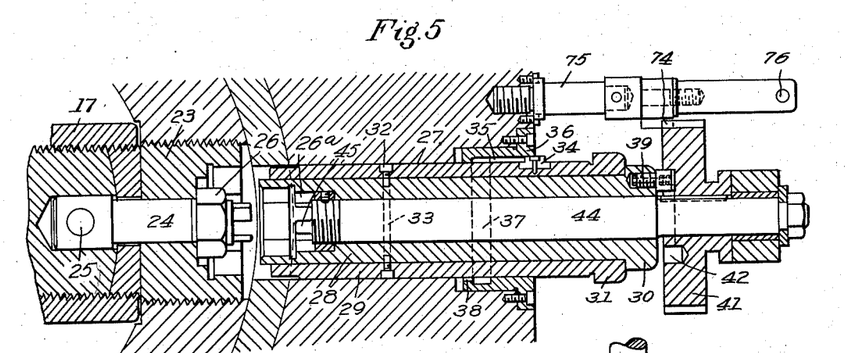
Figures 5, 6 and 7 show three working positions of part of the mechanism for carrying out the adjustment according to the invention.

In operation, when it is desired to make an adjustment of the eccentric throw, the bores 15, 15 having been set in alignment with the locking barrels 28, 29 in the position shown in Figure 5 and with the eccentric at the top of its stroke, the handwheel 49 in Figure 2 is rotated to cause a forward movement of the gear wheels 41, 41a on the bracket 48. The locking barrels are thus moved forward to the position shown in Figure 6 so that they engage at their forward ends with the tightening nut 23 and the locking nut 26.

Figure 6:
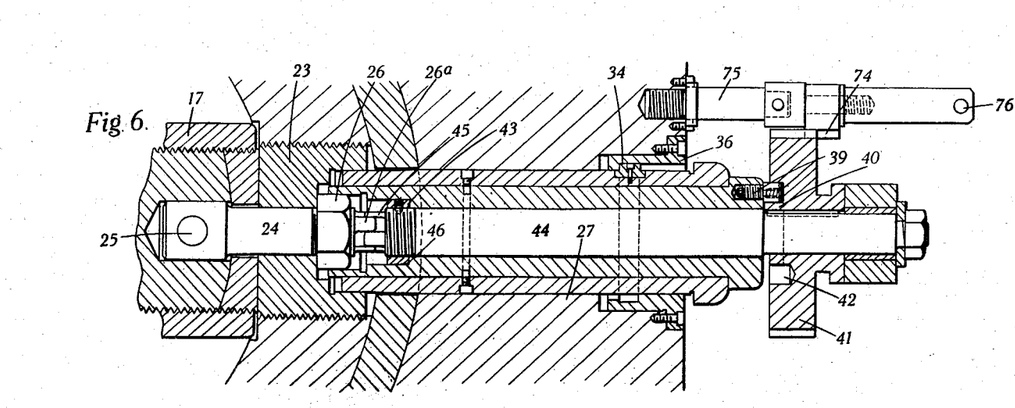

The stop 34 on the outer locking barrel will then be in the position shown in Figure 6 and further forward movement is prevented.

The inner locking barrel is then rotated by means of a wrench or spanner applied to the projecting end 30, thereby causing the locking nut 26 to be loosened, the extent of loosening being determined by the length of the groove 40.

The outer locking barrel 29 is similarly rotated to loosen the tightening nut 23, the length of the groove 37 being slightly less than the length of the groove 40 thus ensuring that there will be no interlocking between the tightening nut and its locking-nut.

Figure 7:
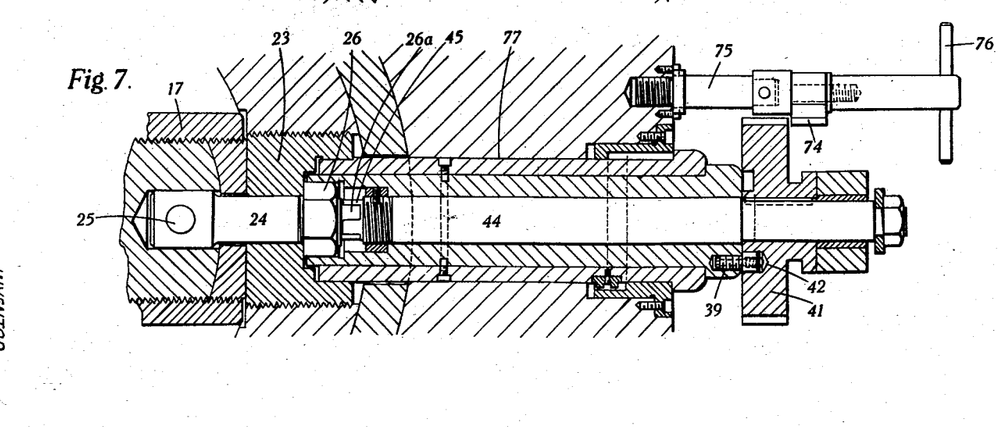

When the outer barrel has been fully turned the two barrels are moved axially by the hand wheel 49 through the bracket 48 until the parts assume the position shown in Figure 7. In this position the plunger 39 is in the cavity 42 in the inner face of the gear wheel 41, and the stop 34 on the outer locking barrel is in the cavity 38 in the bushing 36. All parts are now ready for adjustment of the screw members. This adjustment may be effected by hand power applied either to one of the gears of the train of gears or by a spanner to the head 30 of the inner barrel 28.

Alternatively the power can be applied to the train of gears 61 down to 41 and 41a from the electric motor 62. At this time the cover plate 64x is in the position shown in Figure 1 so that the control buttons or switches 64 are approachable, whereas when the bracket 48 carrying the switch box was in the position of Figures 5 and 6 the switches or buttons were not approachable. Assuming that the motor is used and is started, the locking shaft and the inner locking barrel are rotated thereby, the outer locking barrel being prevented by the stop 34 held in the recess 38 from participating in this rotation. It will be understood that it is necessary to rotate the locking nut 26 during the adjustment in order to maintain the position of this nut on the threaded part of the coupling pin and maintain a clearance between it and the tightening nut 23.

Rotation of the adjusting screw members causes a movement of the eccentric sheave and strap with respect to the drive shaft, to vary the eccentric throw to the desired degree.

To ensure that there shall be no movement of the gear wheels when the eccentric is in the adjusted position a rack 74 is provided, mounted on a spindle 75 projecting from the eccentric cap, the teeth of the rack engaging the teeth of the gear-wheel 41 and being disengaged only when the gear wheel is in the adjusting position illustrated in Figure 7. A handle 76 enables the rack to be locked with the rack teeth engaging the teeth of the gear wheel 41 in the adjusted position.

The final forward movement above referred to brings the teeth of the gear wheel 41 out of engagement with the teeth of the rack as shown in Figure 7.

When the adjustment is completed the rack 74 is unlocked by means of the handle 76, and by means of the handle 49 the bracket 48 is fed out until the stop 34 is withdrawn from the cavity 38 and the plunger 39 from the cavity 42. The rack is then locked. The locking barrels are then rotated by means of a wrench or spanner so as to lock the tightening nut 23 and locking nut 26. The bracket is then further withdrawn, the gear wheels 41 and 41a being withdrawn by means of the members 51, and the locking barrels by means of the collar 43, until the parts are in the position shown in Figure 5.

The electric motor in driving the gear train during the adjusting operation rotates the shaft 55 an amount corresponding to the extent of adjustment required between the drive shaft and sheave. This rotation is transmitted through the gear wheel 65 to the split jointing sleeve 67 which rotates relatively to the part of the driven member 68 screw-threaded therein, causing the member 68 to be moved a distance corresponding exactly to the extent of eccentric throw adjustment. The eccentric drive shaft centre and the pivotal position of connection to the driven part are thus maintained equi-distant.

Either of the locking shafts 44, 44a may be extended as at 44b and be screw-threaded to operate indicating means from which the extent of adjustment of the throw of the eccentric may be noted on a scale 78 and micrometer dial 79 carried by a bracket 77. The bracket 77 also has pivoted thereto a double-cranked arm 80 spring pressed to rock by travel of a nut (not shown) on the screw-threaded extension 44b when the adjustment has reached its limits and by so rocking to actuate a switch 81 to stop the motor.

The driving motor rotates very slowly so that the extent of adjustment may be readily noted on the indicator and the motor stopped by operation of one of the switches when the desired limit has been reached.

Means are also provided to prevent the motor being operated when the gear wheels are in the locked position. It will be understood that means are provided to prevent the rotation of the main drive shaft when the shafts 44, 44a are in the adjusting position as shown in Figure 7.

What I claim is:

1. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging said flats thereon, a motion transmitting strap enveloping said sheave, and means for setting the eccentricity of said sheave on said shaft, said means comprising a screw member passing completely through the shaft and extending across said elongated slot in the sheave to bear against the end walls of said slot, said screw member being formed in two parts interconnected to rotate as one but capable of slight longitudinal movement with respect to one another, and a bush being fitted in a counterbored recess in the shaft for each part of the screw member.

2. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging said flats thereon, a motion transmitting strap enveloping said sheave, means for setting the eccentricity of said sheave on said shaft, said means comprising a screw member passing completely through the shaft and extending across said elongated slot in the sheave to bear against the end walls of said slot and means for self-seating of the ends of said screw member on spherical bearing surfaces.

3. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging said flats thereon, a motion transmitting strap enveloping said sheave, means for setting the eccentricity of said sheave on said shaft, said means comprising a screw member passing completely through the shaft and extending across said elongated slot in the sheave to bear against the end walls of said slot, a tightening nut mounted on the sheave to lock the screw member after being turned to set the eccentricity, a shaft for actuating the screw member, a locking nut for said tightening nut, and a pair of coaxially slidable cylindrical barrels on said shaft for engaging the nuts whereby the nuts can be slackened prior to actuating the screw member, and can be locked after actuation of the screw member.

4. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging said flats thereon, a motion transmitting strap enveloping said sheave, means for setting the eccentricity of said sheave on said shaft, said means comprising a screw member passing completely through the shaft and extending across said elongated slot in the sheave to bear against the end walls of said slot, a tightening nut mounted on the sheave to lock the screw member after being turned to set the eccentricity, an operating shaft for actuating said screw member, a locking nut for said tightening nut, and a pair of coaxially slidable cylindrical barrels on said operating shaft for engaging said nuts whereby said nuts can be slackened prior to actuating said screw member, and can be locked after actuation of said screw member, and means for turning said operating shaft simultaneously with operation of the barrel that engages the locking nut, and means for preventing rotation of the other barrel when the latter is engaging the tightening nut.

5. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging said flats thereon, a motion transmitting strap enveloping said sheave, means for setting the eccentricity of said sheave on said shaft, said means comprising a screw member passing completely through the shaft and extending across said elongated slot in the sheave to bear against the end walls of said slot, a tightening nut mounted on the sheave to lock the screw member after being turned to set the eccentricity, an operating shaft for actuating the screw member, a locking nut for the tightening nut, and a pair of coaxially slidable cylindrical barrels on said operating shaft for engaging the nuts whereby the nuts can be slackened prior to actuating said screw member, and can be locked after actuation of said screw member, also manually operable means for adjusting the screw member, an electric motor also for adjusting said screw member and motor control means approachable only when the adjusting means have released the tightening and locking nuts.

6. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging the flats thereon, a motion-transmitting strap enveloping said sheave and means for setting the eccentricity of said sheave on said shaft, said means comprising a screw member passing completely through said shaft and extending across said elongated slot in said sheave to bear against an end wall of said slot, said screw member being formed in two parts interconnected to rotate as one, but free to move longitudinally with respect to each other and both in screw threaded engagement with said shaft.

7. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging the flats thereon, a motion-transmitting strap enveloping said sheave, means for setting the eccentricity of said sheave on said shaft, and means comprising a first rotating screw member passing completely through said shaft and extending across said elongated slot in said sheave to bear against an end wall of said slot, and a second rotating screw member, similar to said first screw member, to form a pair cooperable side by side in the sheave, means interconnecting said first and second screw members to ensure movement of one screw member being identical with and simultaneous with the other, to ensure parallelism of bodily movement of said sheave on said shaft, and each of said pair of screw members being formed in two parts interconnected to rotate as one, but free to move longitudinally with respect to each other and both being in screw threaded engagement with said shaft.

8. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging the flats thereon, a motion-transmitting strap enveloping said sheave, means for setting the eccentricity of said sheave on said shaft, said means comprising a rotating screw member passing completely through said shaft and extending across said elongated slot in said sheave to bear against an end wall of said slot, said screw member being formed in two parts interconnected to rotate as one, but free to move longitudinally with respect to each other and both are in screw-threaded engagement with said shaft.

9. Eccentric mechanism comprising a rotatable shaft formed with a pair of parallel flats, a sheave rotatable with said shaft and having limited transverse rectilinear freedom with respect thereto by being formed with an elongated slot enveloping said shaft and slidably engaging said flats thereon, a motion transmitting strap enveloping said sheave, and means for setting the eccentricity of said sheave on said shaft, said means comprising a screw member passing completely through the shaft and extending across said elongated slot in the sheave to bear against the end walls of said slot, said screw member being formed in two parts interconnected to rotate as one and tightening means to lock said screw member after being turned to set the eccentricity.

ANIELLO HENRY VESPOLI.